United States Patent
Arakawa

(10) Patent No.: US 11,434,545 B2
(45) Date of Patent: Sep. 6, 2022

(54) LITHIUM RECOVERY METHOD

(71) Applicant: JX NIPPON MINING & METALS CORPORATION, Tokyo (JP)

(72) Inventor: Junichi Arakawa, Tsuruga (JP)

(73) Assignee: JX NIPPON MINING & METALS CORPORATION, Tokyo (JP)

(*) Notice: Subject to any disclaimer, the term of this patent is extended or adjusted under 35 U.S.C. 154(b) by 374 days.

(21) Appl. No.: 16/499,170

(22) PCT Filed: Mar. 28, 2018

(86) PCT No.: PCT/JP2018/013029
§ 371 (c)(1),
(2) Date: Sep. 27, 2019

(87) PCT Pub. No.: WO2018/181608
PCT Pub. Date: Oct. 4, 2018

(65) Prior Publication Data
US 2021/0108285 A1    Apr. 15, 2021

(30) Foreign Application Priority Data
Mar. 30, 2017  (JP) ............................. JP2017-068967

(51) Int. Cl.
C22B 26/12    (2006.01)
C22B 7/00     (2006.01)
C22B 3/00     (2006.01)

(52) U.S. Cl.
CPC .............. *C22B 26/12* (2013.01); *C22B 7/006* (2013.01); *C22B 23/0453* (2013.01)

(58) Field of Classification Search
CPC ..... C22B 26/12; C22B 7/006; C22B 23/0453; C22B 3/44; Y02P 10/20
(Continued)

(56) References Cited

U.S. PATENT DOCUMENTS 8,298,502 B2 * 10/2012 Yamaoka .............. H01M 10/54
                                                    423/179
2011/0002825 A1  1/2011 Yamaoka et al.
(Continued)

FOREIGN PATENT DOCUMENTS

CN  102002595 A  4/2011
CN  102031374 A  4/2011
(Continued)

OTHER PUBLICATIONS

Extended European Search Report, dated Nov. 9, 2020, for corresponding European Application No. 18778276.8.
(Continued)

*Primary Examiner* — Brian D Walck
*Assistant Examiner* — Danielle Carda
(74) *Attorney, Agent, or Firm* — Birch, Stewart, Kolasch & Birch, LLP

(57) ABSTRACT

A method for recovering lithium according to this invention comprises separating sodium from a lithium-containing solution containing lithium ions and sodium ions to recover lithium, wherein the method comprises a solvent extraction step including: at least three-stage extraction process having a first extraction process, a second extraction process, and a third extraction process; and a lithium back extraction stage of back extracting the lithium ions from a solvent that have undergone the at least three-stage extraction process; and wherein, in the extraction process, the solvent undergoes the first extraction process, the second extraction process, and the third extraction process in this order, and a solution as the lithium-containing solution undergoes the respective processes in opposite order to the order of the solvent.

12 Claims, 3 Drawing Sheets

(58) Field of Classification Search
USPC .......................................................... 75/743
See application file for complete search history.

(56) References Cited

U.S. PATENT DOCUMENTS

| | | |
|---|---|---|
| 2011/0072936 A1 | 3/2011 | Narisako et al. |
| 2017/0077564 A1* | 3/2017 | Wang .................... C01G 53/50 |

FOREIGN PATENT DOCUMENTS

| | | |
|---|---|---|
| CN | 105483382 A | 4/2016 |
| CN | 106521159 A | 3/2017 |
| JP | 2007-122885 A | 5/2007 |
| JP | 2009-193778 A | 8/2009 |
| JP | 4581553 B2 | 11/2010 |
| JP | 2011-11961 A | 1/2011 |
| JP | 2014-162982 A | 9/2014 |
| JP | 2016-60926 A | 4/2016 |
| WO | WO 2014/042136 A1 | 3/2014 |

OTHER PUBLICATIONS

International Preliminary Report on Patentability, dated Oct. 10, 2019 and English translation of the Written Opinion of the International Searching Authority(Forms PCT/IB/326, PCT/IB/373, PCT/IB/338 and PCT/ISA/237), dated May 22, 2018, for International Application No. PCT/JP2018/013029.
International Search Report for PCT/JP2018/013029 (PCT/ISA/210) dated May 22, 2018.

* cited by examiner

[FIG. 1]
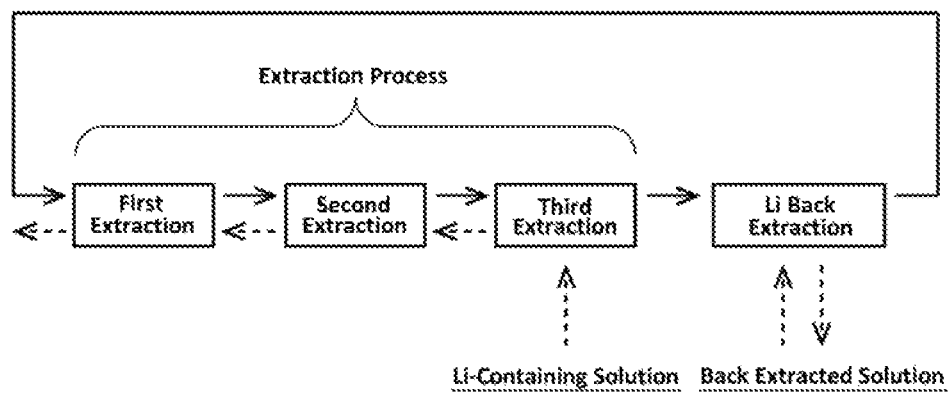

[FIG. 2]
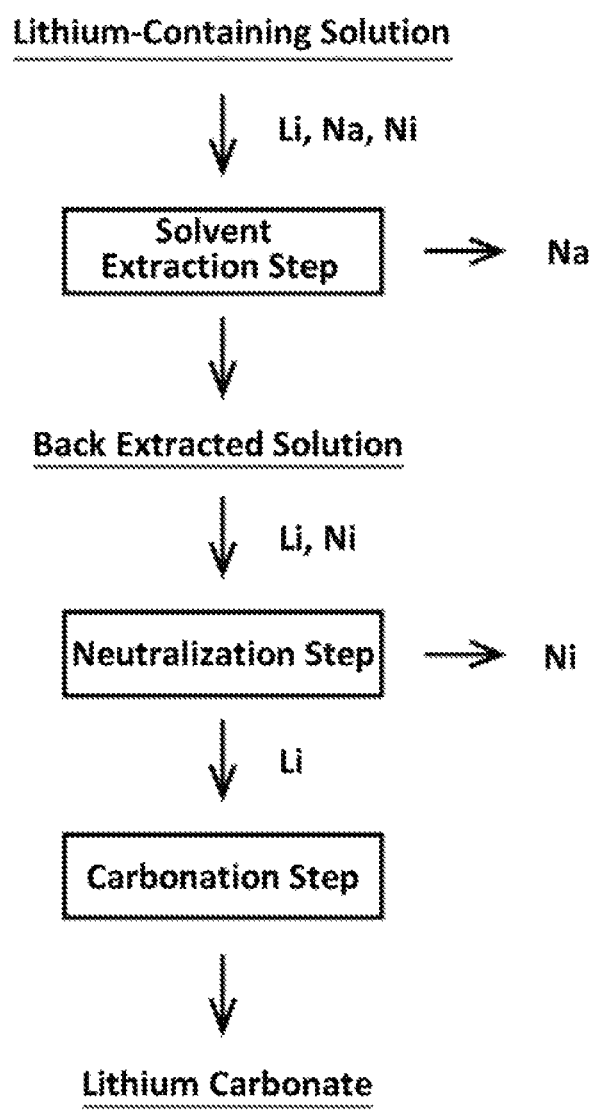

[FIG. 3]
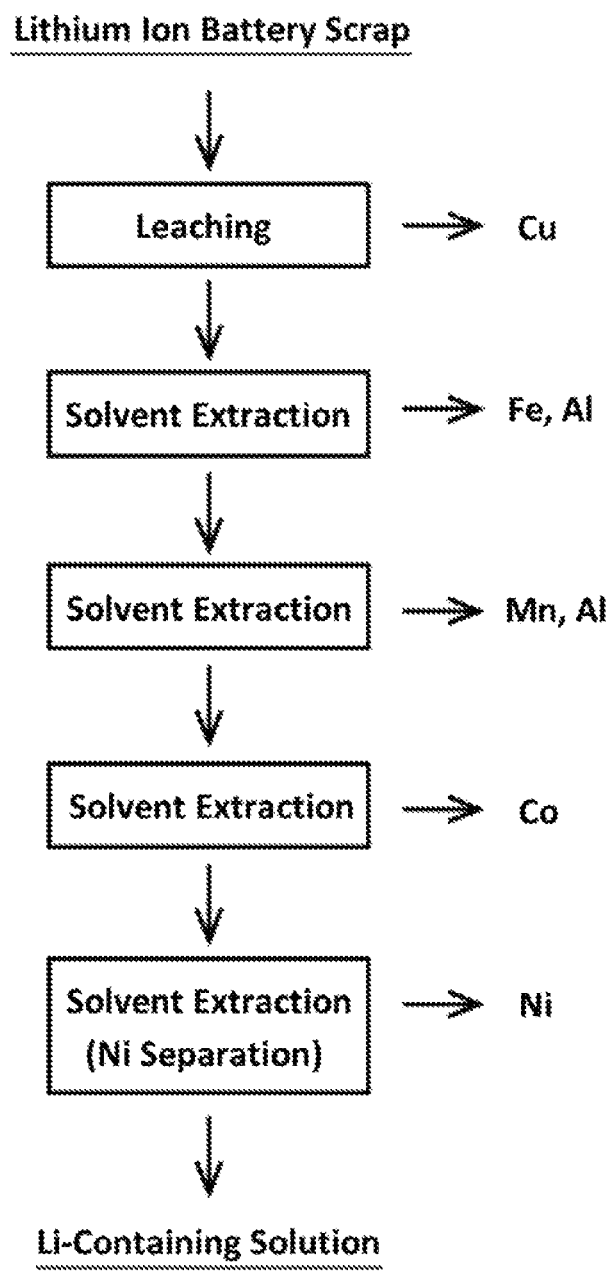

LITHIUM RECOVERY METHOD

TECHNICAL FIELD

The present invention relates to a method for recovering lithium by separating sodium from a lithium-containing solution containing lithium ions and sodium ions, and in particular, proposes a technique capable of providing high purity lithium when recovering metals from lithium ion battery scrap.

BACKGROUND ART

In recent years, it has been widely studied that valuable metals such as nickel and cobalt are recovered from lithium ion battery scrap and the like discarded for expired product life or other reasons by means of wet processing or the like, in terms of effective utilization of resources.

For example, in order to recover valuable metals from lithium ion battery scrap, the lithium ion battery scrap is typically calcined to remove harmful electrolytes and then subjected to crushing and sieving in this order. Subsequently, battery powder obtained under a sieve for the sieving is leached by adding it to a leaching solution, whereby lithium, nickel, cobalt, manganese, iron, copper, aluminum and the like which can be contained therein are dissolved in the solution.

Then, iron, copper, aluminum, and the like are removed sequentially or simultaneously among the respective metal elements dissolved in the leached solution to recover valuable metals such as cobalt, manganese and nickel. More particularly, the leached solution is subjected to multiple stages of solvent extraction or neutralization according to the metals to be separated, and further, each solution obtained at each stage is subjected to stripping, electrolysis, carbonation or other treatments. Accordingly, a lithium-containing solution containing lithium ions is obtained.

The lithium-containing solution thus obtained is generally subjected to carbonation by adding a carbonate salt or blowing a carbon dioxide gas to recover a lithium ion contained in the lithium-containing solution as lithium carbonate.

As such a type of technique, Patent Document 1 discloses that a lithium ion is recovered as solid lithium carbonate by adjusting a pH of an aqueous solution containing lithium ions to pH 4 to 10 depending on acidic solvent extracting agent used for extraction of lithium ions, bringing the aqueous solution into contact with the acidic solvent extracting agent to extract lithium ions, and then bringing the solvent extracting agent into contact with an aqueous solution having a pH of 3.0 or less to strip lithium ions, repeating the above stripping operations using the resulting aqueous lithium ion solution to concentrate the lithium ions, and mixing the resulting high-concentration lithium ion aqueous solution with a water-soluble carbonate while maintaining the high-concentration lithium ion aqueous solution at 50° C. or higher.

CITATION LIST

Patent Literature

Patent Document 1: Japanese Patent No. 4581553 B

SUMMARY OF INVENTION

Technical Problem

The lithium-containing solution as described above may contain an increased amount of sodium ions due to, for example, the addition of sodium hydroxide for the purpose of adjusting the pH.

In this case, when lithium carbonate is obtained from the lithium-containing solution by carbonation, sodium will become contained in lithium carbonate. Therefore, it may cause a problem that there are large burdens related to purification of lithium carbonate in order to obtain lithium carbonate containing lithium with high quality. Further, when a back-extraction solution is based on a sulfuric acid, sodium sulfate may be precipitated to cause process troubles such as piping blockage.

This invention has been made by focusing on such problems. An object of the present invention is to provide a method for recovering lithium, which can effectively recover high purity lithium from a lithium-containing solution containing lithium ions and sodium ions.

Solution to Problem

As a result of intensive studies, the present inventors have found that a lithium-containing solution containing lithium ions and sodium ions is continuously subjected to a predetermined number of solvent extractions, and the solvent extractions are carried out such that a flow of a solvent and a flow of a solution are in opposite directions to each other, whereby the sodium ions are effectively separated.

Based on the findings, a method for recovering lithium according to this invention comprises separating sodium from a lithium-containing solution containing lithium ions and sodium ions to recover lithium, wherein the method comprises a solvent extraction step including: at least three-stage extraction process having a first extraction process, a second extraction process, and a third extraction process; and a lithium back extraction stage of back-extracting the lithium ions from a solvent that have undergone the at least three-stage extraction process; and wherein, in the extraction process, the solvent undergoes the first extraction process, the second extraction process, and the third extraction process in this order, and a solution as the lithium-containing solution undergoes the respective processes in opposite order to the order of the solvent.

It is preferable that in the method for recovering lithium according to this invention, the at least three stage extraction process comprises extracting the lithium ions and the sodium ions in the solution into the solvent, in each of the extraction processes excluding a final extraction process of the first extraction process to the final extraction process, and also back-extracting the sodium ions in the solvent into the solution in the final extraction process.

Further, it is preferable that in the method for recovering lithium according to this invention, a pH of a final extraction process in the at least three stage extraction process is from 3.5 to 4.5.

It is also preferable that in the method for recovering lithium according to this invention, a solvent after back-extracting the lithium ions in the lithium back extraction process is used as the solvent in the first extraction process.

It is also preferable that in the method for recovering lithium according to this invention, in the at least three stage extraction process a pH of the first extraction process is from 6.0 to 6.5, and a pH of the extraction process excluding a final extraction process of the second extraction process to the final extraction process is from 5.5 to 6.0.

The lithium-containing solution can have a pH of from 2.0 to 7.0.

A molar ratio of a sodium concentration to a lithium concentration in the lithium-containing solution is preferably from 2 to 100.

The method for recovering lithium according to this invention further comprises a nickel separation step of separating nickel from a solution containing lithium and nickel prior to the solvent extraction step, and the lithium-containing solution is obtained in the nickel separation step.

In the nickel separation step, nickel can be separated by solvent extraction, and a carboxylic acid-based extracting agent can be used for the solvent extraction.

In the method for recovering lithium according to this invention, the lithium-containing solution may further contain nickel ions, and a back-extracted solution obtained in the lithium back-extraction process may contain lithium ions and nickel ions.

In this case, the method further comprises, after the solvent extraction process, a neutralization step of neutralizing the back-extracted solution to remove nickel, and after the neutralization step, a carbonation step of obtaining lithium carbonate from a neutralized solution.

In the method for recovering lithium according to this invention, the lithium-containing solution is preferably obtained by processing lithium ion battery scrap.

Specifically, the processing to the lithium ion battery scrap can comprise a leaching step of leaching the lithium ion battery scrap and a recovery step of recovering metals dissolved in the resulting leached solution by solvent extraction.

Advantageous Effects of Invention

According to the method for recovering lithium of the present invention, the solvent undergoes the first extraction process, the second extraction process, and the third extraction process in this order in the extraction process, and a solution as the lithium-containing solution undergoes the respective processes in opposite order to the order of the solvent, whereby after the extraction processes, the lithium ions are effectively extracted into the solvent, while the sodium ions are effectively removed from the solvent.

As a result, high purity lithium can be efficiently recovered.

BRIEF DESCRIPTION OF DRAWINGS

FIG. 1 is a flowchart showing details of a solvent extraction step of a lithium recovery method according to an embodiment of the present invention.

FIG. 2 is a flowchart showing the solvent extraction step in FIG. 1 and subsequent steps.

FIG. 3 is a flowchart showing an example of steps for obtaining a lithium-containing solution that can be used in the lithium recovery method in FIG. 1 from lithium ion battery scrap.

DESCRIPTION OF THE PREFERRED EMBODIMENTS

Hereinafter, embodiments of the present invention will be described in detail.

The lithium recovery method according to one embodiment of this invention is a method for separating lithium from a lithium-containing solution containing lithium ions and sodium ions to recover lithium. As illustrated in FIG. 1, the method has a solvent extraction step which includes: a first extraction process, a second extraction process, and a third extraction process; and a lithium back extraction process of back-extracting the lithium ions from a solvent after the third extraction process. Here, the solvent undergoes the first extraction process, the second extraction process, the third extraction process, and the lithium back extraction process in this order, and a solution as the lithium-containing solution undergoes the third extraction process, the second extraction process, and the first extraction process in this order.

(Lithium-Containing Solution)

The lithium-containing solution herein contains at least lithium ions and sodium ions. In order to effectively remove sodium from such a lithium-containing solution to obtain high purity lithium carbonate in a carbonation step as described below or the like, the lithium-containing solution is subjected to the solvent extraction step.

A lithium concentration in the lithium-containing solution is, for example, from 0.5 g/L to 10.0 g/L, typically from 1.0 g/L to 7.0 g/L, and a sodium concentration is, for example, from 1.0 g/L to 50.0 g/L, typically from 20.0 g/L to 40.0 g/L. Further, a molar ratio of the sodium concentration to the lithium concentration in the lithium-containing solution (Na/Li molar ratio) is, for example, from 2 to 100, and more effectively 10 or more. This embodiment can be applied to the lithium-containing solution containing sodium ions at this level.

The lithium-containing solution may further contain from 10 mg/L to 500 mg/L, typically 20 mg/L to 100 mg/L of nickel, for example when nickel remains without being separated in the previous nickel separation step. Thus, even if it contains nickel, the nickel can be effectively recovered from a back-extracted solution obtained in the solvent extraction step, as will be described later.

The lithium-containing solution may further contain cobalt, aluminum, calcium and the like in the total amount of 1.0 g/L or less.

(Solvent Extraction Step)

In order to separate and remove sodium from the lithium-containing solution, the solvent extraction step includes an extraction process having: a first extraction process, a second extraction process, and a third extraction process; and a lithium back extraction process. Here, by the first extraction process, the second extraction process and the third extraction process, the lithium ions contained in the lithium-containing solution are extracted into the solvent, but the sodium ions can remain in the solution, and the lithium ions are back-extracted from the solvent in the lithium back extraction process to obtain a back-extracted solution in which the lithium ions are contained and the sodium ions have been removed. In this embodiment with three extraction processes, the third extraction process corresponds to a final extraction process immediately before the lithium back extraction process.

The solvent used in the solvent extraction step can be, for example, a phosphonate ester extracting agent (PC-88A), a phosphate ester extracting agent (D2EHPA), or the like. These produce an effect of capable of effectively separating sodium.

In the solvent extraction step, as shown in FIG. 1, it is important that a flow of the solvent and a flow of the solution are in opposite directions to each other in the first extraction process, the second extraction process and the third extraction process. More particularly, the solvent after the first extraction process is used as a solvent for the second extraction process, and the solvent after the second extraction process is used as a solvent for the third extraction process. The lithium-containing solution is firstly used in the third extraction process, and the solution after the third extraction process is used as a solution in the second extraction process, and the solution after the second extraction process is used as a solution in the first extraction process.

In the first extraction process, the solvent extraction is carried out using an unused new solvent or a solvent after back-extracting lithium in the lithium back extraction process as shown in the figure, and a solution after sequentially undergoing the third extraction process and the second extraction process. The purpose herein is to extract the lithium ions and sodium ions in the solution into a solvent.

A pH of the first extraction process is preferably from 6.0 to 6.5. If the pH at this time is too high, sodium may be excessively extracted. On the other hand, if the pH is too low, there is a concern that lithium may be insufficiently extracted. Therefore, the pH of the first extraction process is more preferably from 6.1 to 6.3.

In the second extraction process, the solvent extraction is carried out using the solvent after the first extraction process and the solution after the third extraction process. This can allow the lithium ions and sodium ions in the solution to be extracted into the solvent. A pH of the second extraction process is preferably equal to or lower than that of the first extraction process, particularly preferably from 5.5 to 6.0. If the pH in the second extraction process is too high, sodium may be excessively extracted. If the pH is too low, lithium may be insufficiently extracted. From this point of view, the pH of the second extraction process is more preferably from 5.7 to 5.9.

In the third extraction process, the solvent extraction is carried out using the solvent after sequentially undergoing the first extraction process and the second extraction process, and the lithium-containing solution that has not been used in the solvent extraction process. In the third extraction process, the sodium ions contained in the solvent transfer into the solution to be back-extracted, and the lithium ions in the lithium-containing solution are extracted into the solvent.

A pH of the third extraction process is preferably equal to or less than that of the second extraction process, and preferably from 3.5 to 4.5. If the pH in the third extraction process is too high, the back extraction of sodium may be insufficient. On the other hand, if the pH in the third extraction process is too low, lithium may also be back-extracted. Therefore, the pH of the third extraction process is more preferably from 4.0 to 4.2.

By thus undergoing the first extraction process, the second extraction process and the third extraction process, the sodium extracted once will be removed from the solvent, so that the lithium ions are surely contained in the solvent after the third extraction process, and the sodium ions can also be effectively removed from the solvent to separate lithium ions and sodium ions in the lithium-containing solution effectively.

Each extraction process described above can be carried out based on a general method. By way of example, a solution (aqueous phase) is brought into contact with a solvent (organic phase), and these are stirred and mixed at a speed of from 200 to 500 rpm, for example for 5 to 60 minutes, typically using a mixer, to allow the ions to react with the extracting agent. A temperature during extraction is preferably from a normal temperature (about 15 to 25° C.) to 60° C. or less, and preferably from 35 to 45° C. for reasons of an extraction rate, phase separation and evaporation of the organic solvent. The mixed organic phase and aqueous phase are then separated according to a difference in specific gravity by means of a settler. An O/A ratio (a volume ratio of the organic phase to the aqueous phase) is generally from 0.1 to 10 in view of the operation with the mixer settler, and more preferably from 1 to 5, although it depending on the contents of the metals to be extracted.

In the lithium back extraction process, the solvent obtained through the third extraction process can be mixed with a back extracting solution such as sulfuric acid or hydrochloric acid, and stirred by a mixer or the like at a speed of 200 to 500 rpm, for example for 5 to 60 minutes. Sulfuric acid can be preferably used as the back extracting solution. An acid concentration of the back extracting solution is preferably adjusted to 0.05 to 200 g/l (pH: −0.6 to 3.0), more preferably 1.5 to 15 g/(pH: 0.5 to 1.5), in order to effectively back-extract the lithium ions in the solvent. A temperature of the back extraction can be from the normal temperature to 60° C., and preferably from 35 to 45° C., for reasons of a back extraction rate, phase separation, and evaporation of the organic solvent.

The back-extracted solution obtained in the lithium back extraction process contains a higher concentration of lithium ions, but has removed substantially all sodium ions. A lithium concentration in the back-extracted solution is preferably from 5.0 g/L to 30.0 g/L, more preferably from 10.0 g/L to 20.0 g/L. Further, a sodium concentration in the back-extracted solution is preferably 60.0 g/L or less, more preferably 40.0 g/L or less. This enables high purity lithium carbonate to be obtained in a carbonation step as described later.

As described later, the back-extracted solution can be repeatedly used as a back-extracting solution in the lithium back extraction process, after recovering lithium contained therein.

As described above, the extraction process requires at least three stages of the first extraction process, the second extraction process, and the third extraction process. However, although not shown, the extraction process may be performed in four or more stages. In this case, the solvent will undergo the respective stages in order from the first extraction process, while the solution will undergo the respective stages in order from the extraction process finally subjected before the lithium back extraction process (that is, in opposite order to the order of the solvent).

When the extraction process has four or more stages, a pH of the extraction processes excluding the final extraction process of the second extraction process to the final extraction process is from 5.5 to 6.0, particularly from 5.7 to 5.9.

Specifically, for example, in an embodiment having a four-stage extraction process, the pH of the second extraction process and the third extraction process among the second extraction process, the third extraction process, and the fourth extraction process, excluding the fourth extraction process as the final stage, is preferably from 5.5 to 6.0, more preferably from 5.7 to 5.9. Further, when it has such a four stage extraction process, it is preferable that the lithium ions and sodium ions in the solution are extracted into the solvent in each of the first extraction process to the third extraction process excluding the fourth extraction process as the final stage, and in the fourth extraction process, the lithium ions in the solution are extracted into the solvent and the sodium ions in the solvent are back-extracted into the solution.

(Neutralization Step)

When nickel ions are contained in the lithium-containing solution, the nickel ions are extracted and back-extracted together with the lithium ions in the solvent extraction step, and thus are contained in the back-extracted solution. In this case, to separate nickel from the back-extracted solution, a neutralization step can be carried out. The nickel ions contained in the lithium-containing solution are concentrated together with the lithium ions in the solvent extraction step, so that a nickel concentration in the back-extracted solution is, for example, from 200 mg/L to 5000 mg/L, typically from 500 mg/L to 3000 mg/L. When the lithium-containing solution does not contain the nickel ions, the neutralization step can be omitted.

In the neutralization step, an alkali is added to the acidic back-extracted solution to neutralize the back-extracted solution and recover nickel as a solid. Examples of the alkali in this case include sodium hydroxide, calcium hydroxide and the like.

A pH of the back-extracted solution obtained in the lithium back extraction process as described above is from 0.5 to 1.5, for example. However, in the neutralization step, a pH is preferably adjusted to 10 to 13 by adding the alkali to the back-extracted solution. The solution temperature in the neutralization step can be the normal temperature, and the solution can be stirred at a predetermined speed and time after the addition of the alkali.

This enables a nickel concentration in the back-extracted solution to be decreased to about 10 mg/L or less.

(Carbonation Step)

A neutralized solution obtained by removing nickel in the neutralization step may be subjected to a carbonation step to recover lithium contained in the neutralized solution. Here, the lithium ions in the neutralized solution are recovered as lithium carbonate by adding a carbonate salt to or blowing a carbon dioxide gas into the neutralized solution.

After the addition of the carbonate salt or the blowing of the carbon dioxide gas, the solution is maintained, for example at a solution temperature in a range of from 20° C. to 50° C. for a certain period of time, with optionally stirring.

Examples of the carbonate salt added to the neutralized solution include sodium carbonate, ammonium carbonate and the like, preferably sodium carbonate in the terms of a recovery rate. An amount of the carbonate salt added can be, for example, from 1.0 to 1.7 times, preferably from 1.2 to 1.5 times the Li molar amount. The amount of the carbon dioxide gas added can be, for example, from 1.0 to 1.7 times, preferably from 1.2 to 1.5 times the Li molar amount.

When the carbonate salt is added, the carbonate salt in the form of solid is preferably added to the neutralized solution, without dissolving the carbonate in water or the like. This is because when the carbonate salt is dissolved and added as a solution, the solution increase a solution amount, so that an amount of lithium carbonate dissolved is increased, which causes loss of lithium.

A pH of the neutralized solution during carbonation is preferably relatively high such as 10 to 13. If the carbonate salt is added in a state where the pH is lower, it will be lost as a carbon dioxide gas, so there is a concern that a reaction efficiency may be reduced. By adding the alkali in the neutralization step as described above, the pH of the neutralized solution can be adjusted to the above range.

Lithium carbonate thus obtained has high purity without containing sodium by removing sodium in the solvent extraction step as described above. The lithium quality of lithium carbonate is preferably 17% or more, more preferably 18% or more.

In addition, when the lithium quality of lithium carbonate is lower than a predetermined value, lithium carbonate can be purified to obtain higher quality lithium carbonate. The purification can be carried out by a generally known method.

(Processing of Lithium Ion Battery Scrap)

This invention can be applied to various lithium-containing solutions as long as they contain lithium ions. For example, this invention is preferably applied to lithium-containing solutions obtained by processing lithium ion battery scrap that has been used in mobile phones and other various electronic devices and discarded due to expired battery product life, production defects or other reasons.

As an example of the processing of the lithium ion battery scrap, the lithium ion battery scrap is subjected to a calcination treatment and a chemical treatment as needed, and the lithium ion battery scrap is crushed and sieved to obtain battery powder, and an acidic leaching is then carried out to obtain a leached solution in which battery components have been dissolved, as shown in FIG. 3. Here, copper that can be contained in the lithium ion battery scrap can be removed by solid-liquid separation after leaching without dissolving copper.

Subsequently, the leached solution is subjected to a recovery step including solvent extractions at multiple stages to sequentially separate iron, aluminum, manganese, cobalt and nickel, thereby providing a lithium-containing solution.

The lithium-containing solution thus obtained may contain nickel when nickel is not completely separated in the nickel separation step by solvent extraction as the previous step.

Further, when sodium hydroxide is added to adjust the pH, the above lithium-containing solution contains sodium ions.

EXAMPLES

Next, the method for recovering lithium according to this invention was experimentally carried out and the effects thereof were confirmed, as described below. However, the descriptions herein are merely for illustrative and are not intended to be limited.

Example 1

The first extraction process to the third extraction process and the Li back extraction process were carried out. The pH of the first extraction process was 6.0, the pH of the second extraction process was 5.8, and the pH of the third extraction process was 4.0. In the extracting solution (lithium-containing solution), the Li concentration of was 1.5 g/L and the Na concentration was 45 g/L. From the extracting solution, the back-extracted solution was prepared such that the Li concentration was 12.2 g/L and the Na concentration was 47.3 g/L. The Na/Li molar ratio of the extracting solution was 9.09, the Na/Li molar ratio of the back-extracted solution was 1.173. The ratio of the Na concentration to the Li concentration was about 0.13, indicating that the concentration of Na could be sufficiently reduced.

Example 2

The first extraction process to the third extraction process and the Li back extraction process were carried out. The pH of the first extraction process was 6.0, the pH of the second extraction process was 5.9, and the pH of the third extraction process was 4.8. In the extracting solution (lithium-containing solution), the lithium concentration was 1.1 g/L and the Na concentration was 36 g/L. From the extracting solution, the back-extracted solution was prepared such that the Li concentration was 8.5 g/L and the Na concentration was 46.0 g/L. The Na/Li molar ratio of the extracting solution was 9.90, the Na/Li molar ratio of the back-extracted solution was 1.62. The ratio of the Na concentration to the Li concentration was about 0.16, indicating that the Na concentration was not decreased as compared with Example 1.

What is claimed is:

1. A method for recovering lithium comprising separating sodium from a lithium-containing solution containing lithium ions and sodium ions, wherein the method comprises:
    (A) a solvent extraction step including: at least three-stage extraction process including a first extraction process, a second extraction process, and a third extraction process; and
    (B) a lithium back extraction process of back-extracting the lithium ions from a solvent that has undergone the at least three-stage extraction process;
    wherein, in the at least three-stage extraction process, the solvent undergoes the first extraction process, the second extraction process, and the third extraction process in this order, and a solution of the lithium-containing solution undergoes the respective processes in opposite order to the order of the solvent, and
    wherein a pH of a final extraction process in the at least three stage extraction process is from 3.5 to 4.5.

2. A method for recovering lithium comprising separating sodium from a lithium-containing solution containing lithium ions and sodium ions, wherein the method comprises:
    (A) a solvent extraction step including: at least three-stage extraction process including a first extraction process, a second extraction process, and a third extraction process; and
    (B) a lithium back extraction process of back-extracting the lithium ions from a solvent that has undergone the at least three-stage extraction process;
    wherein, in the at least three-stage extraction process, the solvent undergoes the first extraction process, the second extraction process, and the third extraction process in this order, and a solution of the lithium-containing solution undergoes the respective processes in opposite order to the order of the solvent, and
    wherein in the at least three stage extraction process, a pH of the first extraction process is from 6.0 to 6.5, and a pH of the at least three stage extraction process, except for the first extraction process and a final extraction process is from 5.5 to 6.0.

3. The method according to claim 1 or 2, wherein the at least three stage extraction process comprises extracting the lithium ions and the sodium ions in the solution into the solvent during each of the extraction processes of the at least three stage extraction processes, except for a final extraction process, and back-extracting the sodium ions in the solvent into the solution in the final extraction process.

4. The method according to claim 1 or 2, wherein a solvent after back-extracting the lithium ions in the lithium back extraction process is used as the solvent in the first extraction process.

5. The method according to claim 1 or 2, wherein the lithium-containing solution has a pH of from 2.0 to 7.0.

6. The method according to claim 1 or 2, wherein a molar ratio of a sodium concentration to a lithium concentration in the lithium-containing solution is from 2 to 100.

7. The method according to claim 1 or 2, further comprising a nickel separation step of separating nickel from a solution containing lithium and nickel prior to the solvent extraction step, wherein the lithium-containing solution is obtained in the nickel separation step.

8. The method according to claim 7, wherein nickel is separated by solvent extraction in the nickel separation step.

9. The method according to claim 8, wherein a carboxylic acid-based extracting agent is used for the solvent extraction in the nickel separation step.

10. The method according to claim 1 or 2,
    wherein the lithium-containing solution further contains nickel ions, and a back-extracted solution obtained in the lithium back-extraction process contains lithium ions and nickel ions, and
    wherein the method further comprises, after the solvent extraction process, a neutralization step of neutralizing the back-extracted solution to remove nickel, and after the neutralization step, a carbonation step of obtaining lithium carbonate from a neutralized solution.

11. The method according to claim 1 or 2, wherein the lithium-containing solution is obtained by processing lithium ion battery scrap.

12. The method according to claim 11, wherein the processing to the lithium ion battery scrap comprises: a leaching step of leaching the lithium ion battery scrap; and
    a recovery step of recovering metals dissolved in the resulting leached solution by solvent extraction.

* * * * *